United States Patent
Thomas

(10) Patent No.: US 7,363,347 B2
(45) Date of Patent: Apr. 22, 2008

(54) METHOD AND SYSTEM FOR REESTABLISHING CONNECTION INFORMATION ON A SWITCH CONNECTED TO PLURAL SERVERS IN A COMPUTER NETWORK

(75) Inventor: David Andrew Thomas, Atherton, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 797 days.

(21) Appl. No.: 10/289,311

(22) Filed: Nov. 7, 2002

(65) Prior Publication Data

US 2004/0093416 A1  May 13, 2004

(51) Int. Cl.
G06F 15/16 (2006.01)
(52) U.S. Cl. .................. 709/217; 709/219; 709/228
(58) Field of Classification Search ............. 709/217, 709/219, 220–222, 245, 246, 228
See application file for complete search history.

(56) References Cited

U.S. PATENT DOCUMENTS

| | | | |
|---|---|---|---|
| 5,787,249 A | 7/1998 | Badovinatz et al. | |
| 5,964,857 A | 10/1999 | Srinivasan et al. | |
| 6,167,025 A * | 12/2000 | Hsing et al. | 370/216 |
| 6,396,833 B1 * | 5/2002 | Zhang et al. | 370/392 |
| 6,490,693 B1 * | 12/2002 | Briskey et al. | 714/15 |
| 6,493,347 B2 * | 12/2002 | Sindhu et al. | 370/401 |
| 6,625,659 B1 * | 9/2003 | Aramizu et al. | 709/239 |
| 6,643,693 B1 * | 11/2003 | Reynolds et al. | 709/223 |
| 6,772,211 B2 * | 8/2004 | Lu et al. | 709/226 |
| 6,795,866 B1 * | 9/2004 | Mankude et al. | 709/238 |
| 6,876,654 B1 * | 4/2005 | Hegde | 370/392 |
| 6,944,678 B2 * | 9/2005 | Lu et al. | 709/245 |
| 6,950,877 B2 * | 9/2005 | Asano et al. | 709/238 |
| 6,982,978 B1 * | 1/2006 | Zhang et al. | 370/392 |
| 6,999,459 B1 * | 2/2006 | Callon et al. | 370/400 |
| 7,020,707 B2 * | 3/2006 | Sternagle | 709/230 |
| 2002/0120763 A1 * | 8/2002 | Miloushev et al. | 709/230 |
| 2003/0097454 A1 * | 5/2003 | Yamakawa et al. | 709/229 |

FOREIGN PATENT DOCUMENTS

EP  1128613 A2 *  8/2001

OTHER PUBLICATIONS

Rabin. "Efficient dispersal of information for security, load balancing, and fault tolerance", Journal of the ACM, 36(2):335-348. ACM, Apr. 1989.*

(Continued)

*Primary Examiner*—William Vaughn
*Assistant Examiner*—Yemane Mesfin

(57) ABSTRACT

A method and system are disclosed for reestablishing connection information on a switch connected to plural servers in a computer network. In accordance with exemplary embodiments of the present invention, an identification is made, at the switch, of information to be transferred through the switch between a client and a first server. A determination is made of an absence of connection information on the switch for transferring the information from the client to the first server through the switch. In response to determining an absence of connection information, the connection information on the switch is reconstructed using connection information extracted from an information packet passing through the switch from at least one of the plural servers during a connection associated with the information.

24 Claims, 4 Drawing Sheets

OTHER PUBLICATIONS

Bestavros. "An adaptive information dispersal algorithm for timecritical reliable communications." In I. Frisch, M. Malek, and S Panwar, editors, Network Management and Control, vol. II. Plenum Publishing Corporation, New York, New York, 1994.*

Garay et al., "Secure Distributed Storage and Retrieval" Proceedings of 11th International Workshop on Distributed Algorithms (WDAG97) Lecture Notes in Computer Science 1320, pp. 275-289, 1997.*

Bestavros et al., "TCP Boston: A Fragmentation-tolerant TCP Protocol for ATM Networks," in Proceedings of Infocom'97: The IEEE International Conference on Computer Communication, (Kobe, Japan), Apr. 1997.*

Scalable Content-aware Request Distribution in Cluster-based Network Servers, by Mohit Aron et al., Department of Computer Science, Rice University, Houston, Texas 77005, 15 pgs., 2000.

"Locality-Aware Request Distribution in Cluster-Based Network Servers," by Vivek S. Pai, et al. (Proceedings of the ACM Eighth International Conference on Architectural Support for Programming Languages and Operating Systems (ASPLOS-VIII), Oct. 1998).

"Interconnections, Second Edition,", Table of Contents and Preface, by Radia Perlman (Addison-Wesley, 2000).

Oliver Spatscheck, et al., "Optimizing TCP forwarder performance," IEEE/ACM Transactions on Networking, vol. 8, No. 2, pp. 146-157, Apr. 2000.

* cited by examiner

METHOD AND SYSTEM FOR REESTABLISHING CONNECTION INFORMATION ON A SWITCH CONNECTED TO PLURAL SERVERS IN A COMPUTER NETWORK

CROSS REFERENCE TO RELATED APPLICATIONS

This application is related to U.S. patent application entitled "Method and System for Managing Fragmented Information Packets in a Computer Network," Ser. No. 10/289,308, to U.S. patent application entitled "Method and System for Managing Connections in a Computer Network," Ser. No. 10/289,288, to U.S. patent application entitled "Method and System for Communicating Information Between a Switch and a Plurality of Servers in a Computer Network," Ser. No. 10/289,259, to U.S. patent application entitled "Method and System for Managing Communication in a Computer Network Using Aliases of Computer Network Addresses," Ser. No. 10/289,379, and to U.S. patent application entitled "Method and System for Predicting Connections in a Computer Network," Ser. No. 10/289,259, each of which is filed even date herewith and each of which is hereby incorporated herein by reference in its entirety.

BACKGROUND

1. Field of the Invention

The present invention relates to computer networks. More particularly, the present invention relates to a method and system for reestablishing connection information on a switch connected to a plurality of servers in a computer network.

2. Background Information

To access information on the Internet and, more particularly, the World Wide Web (WWW), users access websites that offer information and/or services. The information and/or services offered by a website are stored in and provided by computer network servers that are generally located remotely from the user. As the number of Internet users grow, computer network servers can experience an increase in the number of connections from clients to access the information and/or services available on these websites. To handle the increased connection load, the computer network servers can be scaled to meet the increased demand. For example, computer network servers can be replicated and the server replicas can be clustered to meet the increased demand. Thus, as the client connection load increases, more servers can be replicated and clustered. Because of their scalability and flexibility, computer network server clusters have become a popular method of meeting increasing communications traffic demands.

Computer network servers based on clusters of workstations or personal computers (PCs) generally include a specialized "front-end" device that is responsible for distributing incoming requests from clients to one of a number of "back-end" nodes, where the "back-end" nodes are responsible for processing the incoming requests from the clients. The front-end is responsible for handing off new connections and passing incoming data from the client to the back-end nodes. In cluster server architectures, the front-end can use weighted round-robin request distribution to direct incoming requests to the back-end nodes. With weighted round-robin distribution, incoming requests are distributed in round-robin fashion and are weighted by some measure of the load on the different back-ends.

To distribute the communications traffic among the back-end nodes, the front-end acts as a load balancer that attempts to evenly distribute the communications traffic load from the clients among the available back-end nodes. A load balancer can be, for example, a switch that connects the servers to the clients for whom the information and/or services are to be provided. To meet increasing connection loads, the load balancers can be upgraded with faster computer processors and more internal computer memory. To further increase performance and improve connection distribution among the back-end nodes, the front-end can use, for example, the content requested, in addition to information about the load on the back-end nodes, to choose which back-end server will handle a particular request.

Content-based request distribution is discussed in, for example, "Locality-Aware Request Distribution in Cluster-Based Network Servers," by Vivek S. Pai, et al. (Proceedings of the ACM Eighth International Conference on Architectural Support for Programming Languages and Operating Systems (ASPLOS-VIII), October 1998), the disclosure of which is incorporated herein by reference in its entirety. However, current load balancers (e.g., front-end switches) do not use the resources offered by the back-end server nodes, which are typically faster and more powerful than the load balancers, to assist the load balancer in determining the distribution of the connections among the back-end nodes. Rather, current load balancers determine request distribution autonomously from the back-end nodes.

One example of a conventional load balancer that can act as a front-end for a computer network cluster is a Layer Four (L4) switch. A L4 switch takes into account Transport Layer information (i.e., Layer Four of the International Organization for Standardization (ISO) Networking model, or ISO model). A discussion of computer network protocols and layers of the ISO model is discussed, for example, in "Interconnections, Second Edition," by Radia Perlman (Addison-Wesley, 2000), the disclosure of which is incorporated herein by reference in its entirety. L4 switches manipulate both the network and transport protocol headers of the communications traffic passing through them to forward the communications traffic to the back-end nodes. A L4 switch can operate with, for example, the Internet Protocol (IP) for the network layer and the Transport Control Protocol (TCP) for the transport layer.

The L4 switch maintains the state of active connections in a connection table that resides in the switch. To deal with cases of switch failure, a backup L4 switch can be used that has a copy of the connection table. When the primary L4 switch fails, the backup L4 switch takes over using the copy of the connection table. To be effective, the copy of the connection table in the backup switch is kept synchronized with the connection table in the primary switch. To maintain synchronization, for example, proprietary protocols are used to copy the information from the connection table of the primary switch to the connection table of the backup switch. Such backup systems can increase the complexity and communications overhead of the switch.

SUMMARY OF THE INVENTION

A method and system are disclosed for reestablishing connection information on a switch connected to plural servers in a computer network. In accordance with exemplary embodiments of the present invention, an identification is made, at the switch, of information to be transferred through the switch between a client and a first server. A determination is made of an absence of connection information on the switch for transferring the information from the client to the first server through the switch. In response to determining an absence of connection information, the connection information on the switch is reconstructed using connection information extracted from an information packet passing through the switch from at least one of the plural servers during a connection associated with the information.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Figure 1:
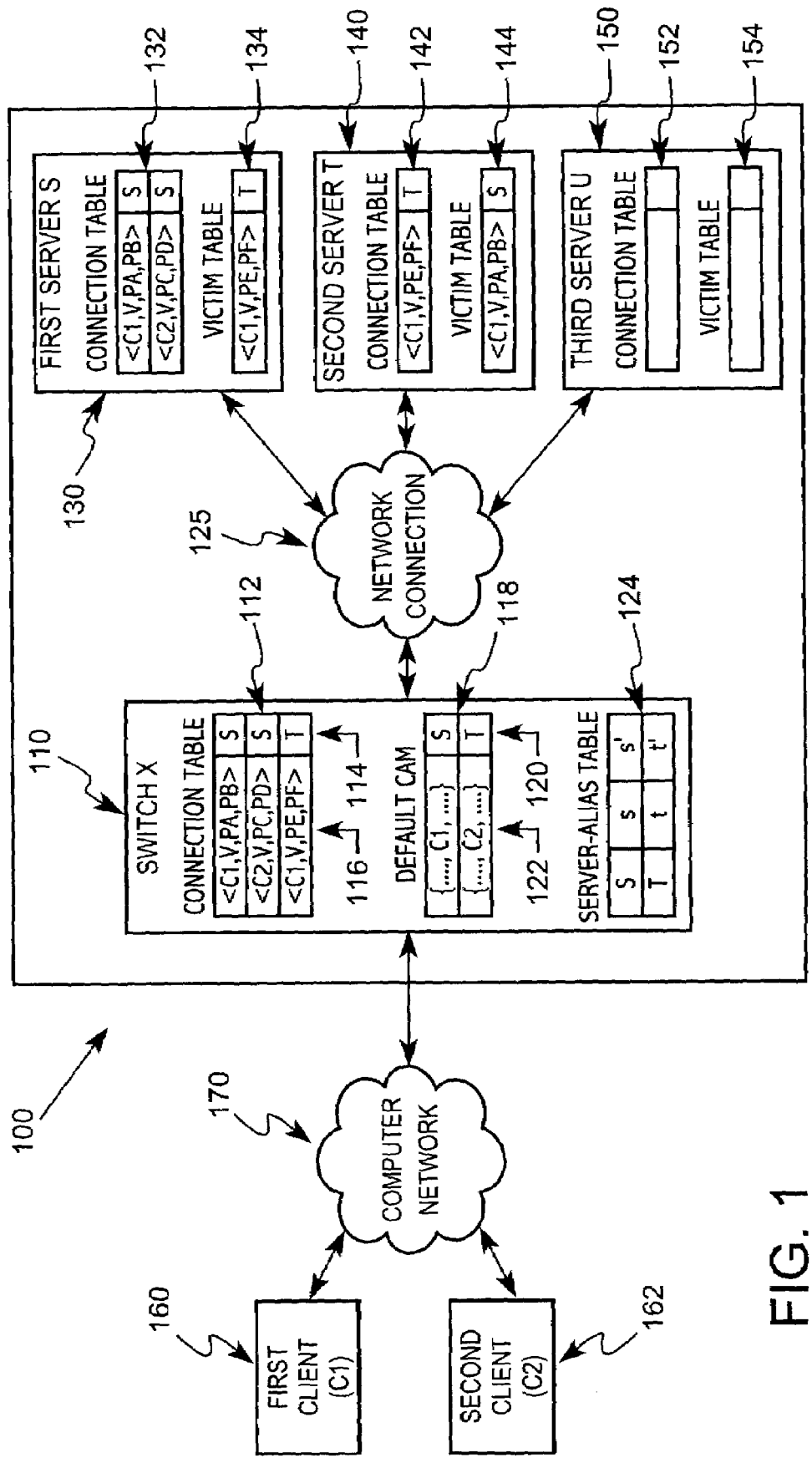
FIG. 1 is a block diagram illustrating a system for reestablishing connection information in a computer network in accordance with an exemplary embodiment of the present invention.

FIG. 1 is a block diagram of a system 100 for reestablishing connection information on a switch, such as switch 110, connected to a plurality of servers in a computer network according to an exemplary embodiment of the present invention. Switch 110 is connected to each of the plurality of servers, for identifying information transferred through the switch 110 between a client 160 and a first server 130. An absence of connection information on the switch 110 used to transfer the information between the client 160 and the first server 130 through the switch 110 can be determined (e.g., determined by the switch). The switch can respond to the determination of the absence of connection information by reconstructing the connection information on the switch 110 using connection information extracted from an information packet passing through the switch 110 from at least one of the plurality of servers during a communication associated with the information (that is, during normal network communication through the switch).

The information to be transferred through the switch can be information included in the information packet from at least one of the plural servers. That is, in a first scenario, an information packet originating from a server is forwarded to the switch. In sending the information packet through the switch, it can be determined that connection information needed to forward the packet to a designated server is absent from the switch. In response, connection information (e.g., a connection tuple) included in an information packet can be extracted and used to reconstruct a connection table at the switch.

In an alternative scenario, information originating from a client is forwarded to the switch in a first information packet. Where the absence of connection information at the switch is determined in response to the passing of this first information packet from the client through the switch, the connection can be handled at the switch using a dispersal algorithm (e.g., a predetermined pattern matching algorithm) which directs the packet to a so-called victim server (that is, a server designated to handle information packets having a particular bit pattern match in specified fields of the information packet). In this scenario, the servers handle the forwarding of the information packets from a victim server to an appropriate destination server. When a second information packet is ultimately sent by the destination server to the switch in response to the first information packet, connection information can be extracted and used to reconstruct the connection information at the switch. Exemplary embodiments of the present invention can therefore avoid sending dedicated control messages to the switch for reconstructing connection information.

According to exemplary embodiments, computer network 170 can be any type of computer network in which information in the form of packets can be transmitted, received, otherwise communicated within and throughout the computer network. For example, computer network 170 can be a local area network (LAN), wide area network (WAN), any type of intranet or internet, or any other type of computer network or computer system capable of transporting packets of information.

As used herein, an "information packet" can be any format of aggregated bits that forms a protocol data unit (PDU) that is capable of carrying any type of information over a packet-switching network. The information packet can carry, for example, data, commands, or any other type of information. According to exemplary embodiments, an information packet can be a transmission control protocol (TCP) PDU, a user datagram protocol (UDP) PDU, or any other form of packet that is capable of carrying any type of information over a packet-switching network.

Switch 110 can receive an information packet through computer network 170 from a client, such as, for example, first client 160, second client 162, or any number of clients. As used herein, a "client" can be any type of computer system, such as, for example, a personal computer (PC), a workstation, a minicomputer, a supercomputer, or any other form of computer system capable of transmitting and receiving information packets over a computer network. According to exemplary embodiments, the client can request, for example, information or services from one or more of the plurality of servers over the computer network. Switch 110 can be connected to the clients remotely. If connected remotely, computer network 170 can be any form of WAN or for example, the Internet. However, switch 110 can be connected to the clients locally using, for example, a LAN or a direct connection to switch 110.

System 100 includes a plurality of servers (e.g., first server 130, second server 140, third server 150, and the like). According to exemplary embodiments, a primary network address and at least a secondary network address can be assigned to each of the plurality of servers. The secondary network address of each of the plurality of servers is an alias for the primary network address of each of the plurality of servers. According to exemplary embodiments, each of the plurality of servers can be any type of computer system, such as, for example, a personal computer (PC), a workstation, a minicomputer, a supercomputer, or any other form of computer system capable of transmitting and receiving information packets over a computer network. According to exemplary embodiments, each server of the plurality of servers can provide, for example, information or services to one or more clients over a computer network in response to requests from the one or more clients for such information or services. System 100 can include any number of servers.

The plurality of servers can be connected to switch 110 through a network 125. Network 125 can be any type of computer network where the Layer 2 header is preserved (for example, a LAN, WAN, or any form of intranet where the Layer 2 header is preserved). The plurality of servers can be connected to switch 110 through network 125 using any form of computer network connection, such as, for example, an Ethernet connection. According to an alternate embodiment, the plurality of servers can be connected directly to switch 110 using any form of connection (e.g., electrical, optical, wireless, wired or the like) capable of transmitting and receiving information between the plurality of servers and switch 110. In such an alternate embodiment, the network connection of network 125 is a direct connection. According to exemplary embodiments, although the plurality of servers can communicate with the clients through switch 110, the plurality of servers can send additional information packets to clients through computer network 170 using alternate mechanisms. For example, the plurality of servers can also include additional network interfaces that connect each of the servers to computer network 170 so that computer network communication can take place without the use of switch 110.

According to exemplary embodiments, switch 110 is a Layer 4 (L4) switch. A L4 switch takes into account Transport Layer Information (i.e., Layer 4 of the ISO model). For example, the L4 switch can examine port numbers of the TCP protocol, although switch 110 can use other transport and network protocols, such as, for example, UDP.

A switch can operate at the Data Link Layer (i.e., Layer 2 of the ISO model). An exemplary Data Link Layer is Ethernet. An Ethernet switch can forward packets without modification.

In contrast to a switch, a router can operate at the Network Link Layer (i.e., Layer 3 of the ISO model). An example of a Network Link Protocol is the Internet Protocol (IP). A network router can interconnect different link layers and generate a new link layer header for each packet passing through the network router. A network router can also manipulate the IP header of packets passing through the network router.

According to exemplary embodiments, switch 110 can be a hybrid of the Ethernet switch and the network router. For example, switch 110 can rewrite or otherwise manipulate the link layer header of information packets, but does not modify information packets in the manner performed by routers. According to exemplary embodiments, switch 110 can use the IP protocol for the network layer and the TCP protocol for the transport layer, although different protocols can be used for the various layers.

According to exemplary embodiments, switch 110 can store, maintain, and manage several tables that can be used to forward information packets between the clients and the plurality of servers. Each table is a collection of information that can be stored in any type of computer memory in switch 110, such as, for example, Random Access Memory (RAM), a hard disk, or any other type of electronic storage medium. For each table, a key/value pair can be used to access information—the key is used to index and locate information in the table and the value is associated with the key.

A table that can be maintained by switch 110 is a connection table 112. Connection table 112 maps connections switch 110 has been informed about to the server that is handling the connection, wherein information packets are communicated between a client and a server of the plurality of servers over the connection. Value field 114 of connection table 112 can hold a value or values representing the name, address or any other designation of a server. Key field 116 include connection tuples associated with the servers in field 114, and field 116 can be used to index or otherwise locate the value in value field 114 that corresponds to the particular key field 116. According to an exemplary embodiment, connection table 112 can be a hash table maintained in RAM of switch 110. Of course, the field 114 can be alternately used as an index field to access the values of field 116.

According to exemplary embodiments, another table that can be maintained by switch 110 is a default content addressable memory (CAM) 118. Default CAM 118 can provide, for example, an initial assignment of connections to servers and it can provide the mapping of non-first fragments to servers. According to exemplary embodiments, default CAM 118 can be a ternary CAM.

A role of the default CAM, according to exemplary embodiments of the present invention, is to implement a dispersal algorithm for handling the absence of connection information in the connection table. The default CAM can be accessed during an initial assignment of connections as mentioned, but can also be accessed when connection information has been lost, deleted, or rendered inaccessible from the connection table for any reason. The dispersal algorithm can be established at the switch by the system 100 in advance, or can be established at the switch by having at least one of the plural servers notify the switch of the dispersal algorithm to be used for allocating computer network address space of the plural servers. In this latter case, a first server can run the dispersal algorithm on all of its connections, and inform all of its potential victim servers of the connections each such victim server will be handling for the first server. Each of the remaining servers can do the same.

An exemplary dispersal algorithm can be a predetermined pattern matching algorithm implemented using a ternary CAM (or other desired mechanism). In a scenario where information (e.g., first information) is directed to the switch from a client, but there is no connection information in the connection table of the switch, the default CAM can be accessed to identify an appropriate so-called victim server to which the first information packet should be forwarded. The servers handle the forwarding of the first information packet from the victim server to the appropriate destination server. A ternary CAM is suitable for use as the default CAM because it is a content addressable memory with "don't care" matching to provide wildcards on various fields of value field 120 as accessed by key field 122. Thus, the ternary CAM can provide pattern matching. If a value matches several patterns in default CAM 118, a priority encoder can be used to determine the result. Priority encoders are described, for example, in U.S. Pat. No. 5,964,857, the entire disclosure of which is hereby incorporated herein.

For example, each information packet can include a connection tuple having a designated number of bits used to represent at least five fields for specifying a source Internet Protocol (IP) address, a destination IP address, a source port, a destination port and a protocol. These bits can be considered to designate an address space that can be allocated among the plural servers. In the absence of connection information in the connection table, the default CAM can be accessed to determine a match on a selected number of these bits (e.g., a match on the four least significant bits of the source IP address whereby a first portion of the address space from "0000" to "0010" can be allocated to a first of four servers). The information packet is thus forwarded to the server preassigned to handle any information packets within the first portion of the address space. The servers can have a preestablished mechanism (e.g., victim tables) for forwarding information packets from a particular victim server to an appropriate destination server.

As an alternate to using predetermined pattern matching, the dispersal algorithm can, for example, be a hash function. That is, any or all of the bits received in an information packet can be used to calculate an entry to a hash table, which in turn, designates an appropriate victim server.

In addition to the connection table and the default CAM, another table that can be maintained by switch 110 is a server-alias table 124. According to exemplary embodiments, server-alias table 124 can perform several functions. For example, server-alias table 124 can contain a list of the plurality of servers. The name, address or other designation of each of the servers can be the value accessed by a key to index or otherwise locate information in the server-alias table (e.g., the Ethernet address corresponding to the IP address of a server). As discussed below, server-alias table 124 can also contain a list of alias addresses for servers that are used by the switch.

According to exemplary embodiments, each of the plurality of servers can also store, maintain, and manage several tables for connection management. Each table is a collection of information that can be stored in any type of computer memory in each of the plurality of servers, such as, for example, Random Access Memory (RAM), a hard disk, or any other type of electronic storage medium. For each table, a key/value pair can be used to access information—the key is used to index and locate information in the table and the value is associated with the key.

Each of the plurality of servers can have a connection table, such as, for example, connection table 132 of first server 130. The server connection table can contain a list of the connections for which the server is the terminating server. In other words, the server connection table lists those connections that the server is handling. Each of the plurality of servers also includes a victim table, such as, for example, victim table 134 of first server 130. The victim table can contain the connection and fragment information that the server handles on behalf of another server. In other words, the victim table lists the non-terminating connections on which the server will receive packets. For each of the information packets received on the non-terminating connection, the victim table lists the terminating server to which the non-terminating server can relay the information packets. The victim tables can be populated as a function of the selected dispersal algorithm.

For purposes of illustration, as shown in FIG. 1, IP addresses are denoted by uppercase letters (e.g., C1, C2, S, T, U). Ethernet addresses (i.e., Medium Access Control (MAC) addresses) are denoted by lowercase letters (e.g., c1, c2, s, t, u). As discussed below, switch 110 can masquerade as a server to pass server address information from one server to another. When switch 110 masquerades as a server, it can use alias addresses denoted by lowercase letters with apostrophes (e.g., s', where s' is an alias for s).

According to exemplary embodiments, switch 110 can connect a plurality of servers to clients over computer network 170. Thus, the switch can act as a "front-end" to the plurality of servers, while the plurality of servers can act as the "back-end." According to exemplary embodiments, IP aliasing can be used when communicating information packets between the plurality of servers and the clients through switch 110. With IP aliasing, switch 110 and the plurality of servers are addressed to clients using a single, collective IP address (e.g., an address "V"). In other words, switch 110 and the plurality of servers appear as a single computer system with a single IP address (e.g., address "V"), such that "knowledge" of the separate components of system 100 is hidden from the clients.

Thus, when a client addresses switch 100 and/or any of the plurality of servers, the client simply sends an information packet to a single IP address (e.g., address "V"). Switch 110 will then direct the packet to the server handling the connection to the client. When sending information packets to clients using IP aliasing, each of the plurality of servers can write the IP source address as the single, collective IP address (e.g., address "V"), and not the server's unique IP address. However, according to exemplary embodiments, at the Ethernet layer, each of the plurality of servers can use their individual Ethernet addresses (i.e., MAC address) as their source Ethernet address.

According to exemplary embodiments, amongst the Layer 2 (L2) (i.e., Ethernet) packet layer, Layer 3 (L3) (i.e., IP) packet layer, and the L4 (e.g., TCP) packet layer, there are six fields which can used to represent packets in system 100: an Ethernet destination address (from the L2 packet layer); an Ethernet source address (from the L2 packet layer); a source IP address (from the L3 packet layer); a destination IP address (from the L3 packet layer); a source port (from the L4 packet layer); and a destination port (from the L4 packet layer). Those skilled in the art will appreciate that an additional protocol field can be included (e.g., to identify TCP), and need not be discussed further. For purposes of illustration and not limitation, a packet from first client 160 (i.e., "C1") to system 100 (i.e., "V") can have the following fields, where "s" represents the Ethernet address of first server 130, "x" represents the Ethernet address of switch 110, and "PA" and "PB" are the source and destination TCP ports, respectively: [x, c1, C1, V, PA, PB]. For example, if first server 130 is handling the connection, the switch 110 can rewrite the packet as: [s, x, C1, V, PA, PB]. When the server sends a reply, the server uses the IP alias "V" instead of its own IP address. Consequently, the reply packet is: [x, s, V, C1, PB, PA].

As noted, the reply packet swaps the source and destination IP addresses. From this swapping, a canonical addressing format can be used to represent packets as follows: <client IP address, server IP address, client port, server port>. In accordance with exemplary embodiments of the present invention, the canonical addressing format is used to represent packets and connections in system 100 of FIG. 1. According to exemplary embodiments, if the packet came from a client, then the fields are in canonical form. If the packet came from a server, then the fields can be swapped to generate the canonical form. Switch 110 can use server-alias table 124 to determine if the packet was sent by a server, and, therefore, the fields should be rearranged. If "V" is the source IP address, then the fields should be swapped. By using a canonical form in accordance with exemplary embodiments, connection table 112 can use a single entry to track a connection for each packet direction. Alternatively, two indices can be used—one for each packet direction.

To reestablish connection information on the switch 110 of the exemplary FIG. 1 embodiment, assume that during an exemplary operation, switch 110 receives an information packet transferred from a first client C1, labeled 160, to the first server 130 on the connection <C1, V1, PA, PB>. The switch 110 upon identifying the information packet, inspects its connection table 112 and determines the absence of connection information for transferring the information packet from client 160 to first server 130. Accordingly, the switch 110 can consult its default CAM, and based on entries included therein, send the packet to a designated server which, in the FIG. 1 example, happens to be the first server 130 (i.e., server S). However, the chosen server could, of course, be any of the other servers illustrated in the FIG. 1 example.

To recover from the absence of information in the connection table for this connection, the switch 110 receives the information packet from the first server 140 for transfer (e.g., sending an acknowledgement) to the first client 160. Because the acknowledgement packet has come from the first server, the switch 110 can create a connection table entry because it has determined that the first server 130 handles the connection <C1, V1, PA, PB>. Thus, the information packet from the first server triggers the recovery of the information in the connection table of the switch 110.

Where a subsequent packet <C1, V1, PA, PB> is transferred from the first client C1 though the switch, the connection table now has the correct information to direct the packet to the first server 130 without the assistance of the default CAM 118.

In another example, an information packet is transferred from the second client 162 (labeled C2) via the switch on the connection <C2, V1, PC, PD>. Upon receipt by the switch, the switch consults its connection table 112 and determines an absence of connection information for transferring the information packet to a server. The switch 110 again consults the default CAM 118, and determines that the second server 140 (labeled T) is to handle this connection in the absence of information in the connection table 112 (e.g., the second server is a designated victim server for this connection). Upon receipt of the information packet by the second server 140, the second server consults its own connection table and determines that it is not the server intended to handle the connection. The second server 140 consults its victim table 144, and discovers that the correct server is the first server 130. The second server 140 therefore forwards the information packet to the first server 130.

When the first server 130 sends an information packet associated with information it received back to the client (e.g., an acknowledgment message), this information packet is passed through the switch, and the switch extracts connection information (e.g., the connection tuple) from this information packet for reconstructing the connection table stored at the switch.

Thus, the switch can respond to the determination of the absence of connection information by reconstructing the connection information using connection information extracted from information packets passing through the switch from one of the plurality of servers during a communication associated with the information (for example, when an acknowledgment is forwarded to the client). Thus, the first server 130 can send an information packet on connection <C2, V1, PC, PD> to the switch 110 for reestablishing the connection information in the connection table 112.

Alternately, in a network topology where an information packet is forwarded by a victim server 140 through the switch 110 to the appropriate destination (e.g., first server 130), the switch can learn that the first server 130 is the correct server for receipt of information packets over the connection <C2, V1, PC, PD> and add the information to the connection table 112 for future information packets from C2.

The sending of the connection information from the correct server (i.e., first server 130) to the switch 110 can also be performed when, for example, forwarding of the information packet from the victim server (i.e., the second server 140 in this case) to the first server 130 is conducted without passing the information through the switch. In this case, an optional message can be generated by the first server and sent to the switch to reconstruct an entry in the connection table for transferring future information packets from the same client directly to the first server. This optional message can be useful in situations where the server rarely sends information packets to the client which would cause the switch to reestablish connection information.

Where a victim server is designated, the victim table can be created in any of numerous ways to those skilled in the art. For example, the first server 130 can forward server connection information to a designated victim server, such as the second server 140, to indicate connections that the victim server will handle on behalf of the first server 130. An address of the victim server can be obtained by the first server 130, using the dispersal algorithm. The switch 110 can be used to forward an information packet to the victim server at, before or after the time a victim server is designated to handle connections on behalf of the first server 130.

In exemplary embodiments, the connection reconstruction information used by the switch 110 can include information from the entire connection tuple of an information packet transmitted through the switch. This connection tuple is extracted and used to create an entry in the connection table of the switch to reconstruct the switch connection information on the switch.

Exemplary embodiments are also directed to methods for performing functions already described with respect to the FIG. 1 embodiment.

Figure 2:
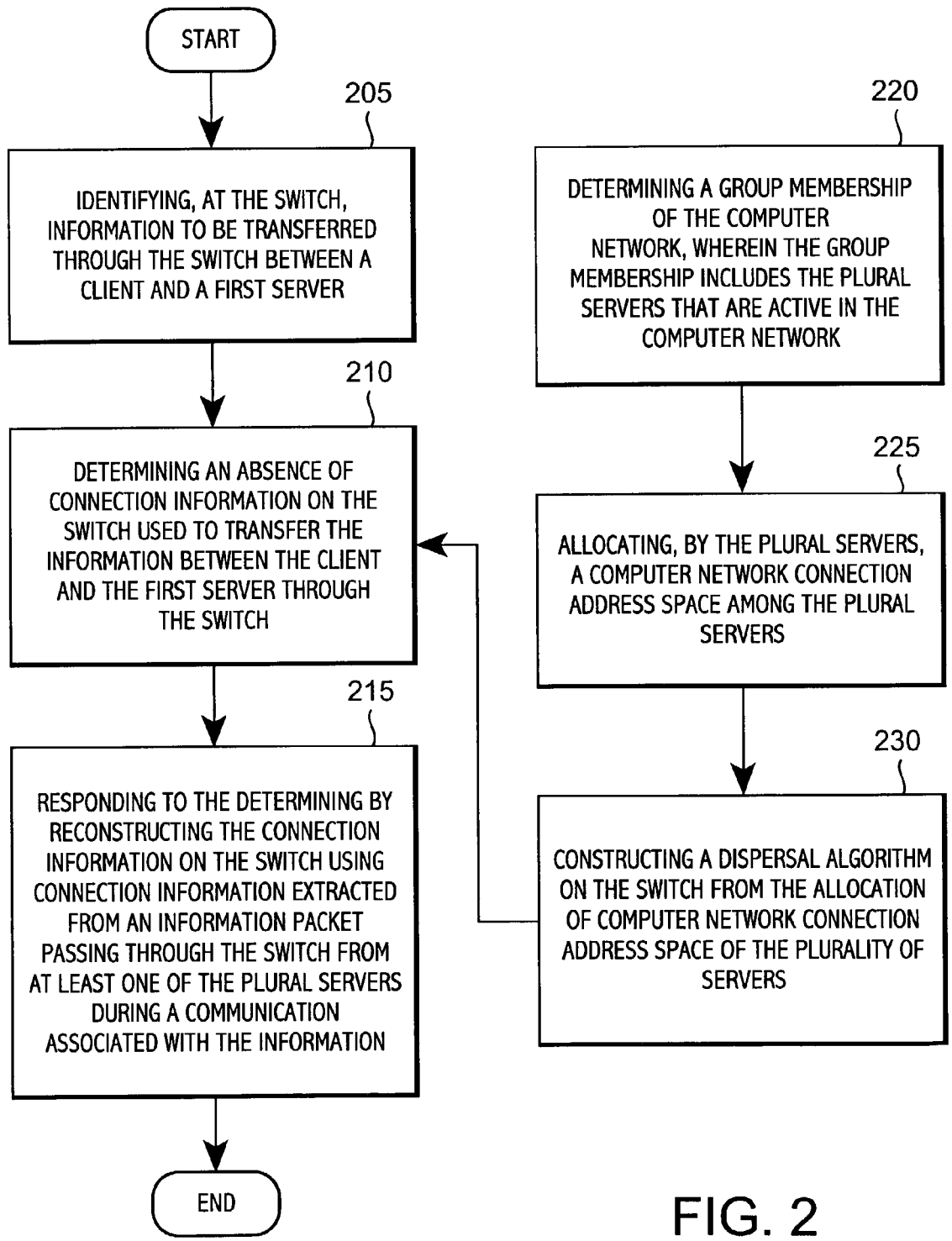
FIG. 2 is a flowchart illustrating steps for reestablishing connection information in a computer network in accordance with an exemplary embodiment of the present invention.

For example, FIG. 2 illustrates an exemplary method for reestablishing connection information on a switch, such as switch 110 of FIG. 1. The FIG. 2 method includes a step 205 of identifying an information packet to be transferred through the switch between a client and a first server. In step 210, an absence of a connection information on the switch used for transferring the information packet from the client to the first server through the switch can be determined. In step 215, the determination of an absence of connection information on the switch can be responded to by reconstructing connection information using connection information extracted from an information packet passing through the switch from a server during a connection associated with the information (e.g., normal traffic passing through the switch in the form of, for example, an acknowledgment message).

Before, during and/or after step 205, the steps 220, 225 and/or 230 can be performed. In step 220, a group membership of the computer network can be optionally determined, wherein the group membership includes the switch and plurality of servers active in the computer network. Alternately, or in addition, in step 225, a computer network connection address space can be allocated by the plurality of servers, among the plurality of servers. In step 230, a dispersal algorithm can be constructed on the switch from the allocation of computer network connection address space of the plurality of servers. The group membership and/or dispersal algorithm can be used to direct an information packet to an appropriate destination in the absence of connection information at the switch using, for example, a victim server.

Figure 3:
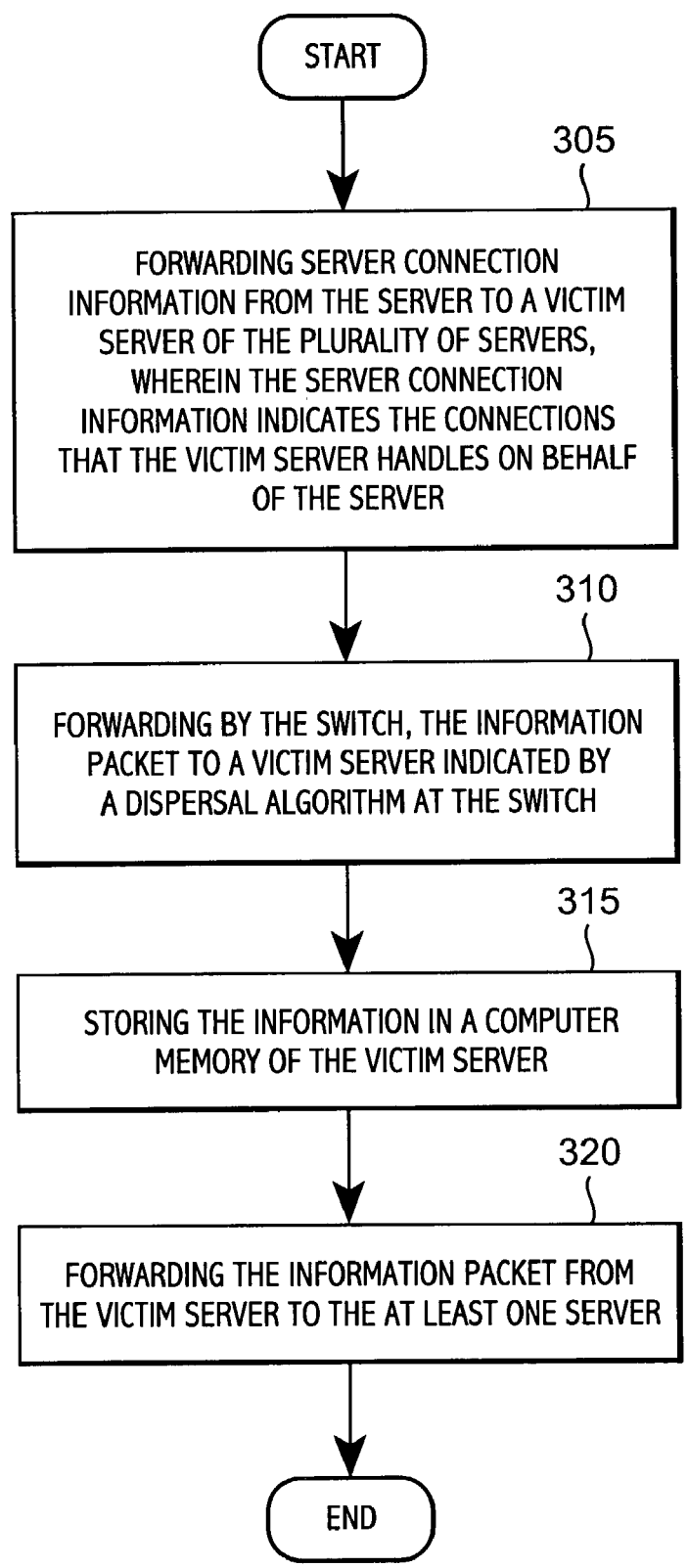
FIG. 3 is a flowchart illustrating steps for determining an absence of connection information on the switch used for transferring the information packet between a client and a first server through the switch in accordance with an exemplary embodiment of the present invention.

FIG. 3 illustrates a flowchart of an exemplary mechanism for forwarding an information packet to an appropriate destination using a victim server. In step 305, a relationship of each server to its victim servers is established. For example, for each server, server connection information is forwarded from the server, such as the first server 130, to a designated victim server(s), such as the second server 140. The server connection information can indicate connections that the victim server handles on behalf of the first server. Step 305 can be performed before, during and/or after the steps 310, 315 and 320. In an exemplary embodiment, the relationship of a server to its victim server(s) is forwarded to the victim server after an information packet destined for the first server has already been stored at the victim server. That is, prior to step 305, a step 310 of determining an absence of connection information at the switch can include a step of forwarding a received information packet to the victim server indicated by a dispersal algorithm included on, or accessible by, the switch. In step 315, the information packet can be stored in a computer memory of the victim server. In step 320, the connection information provided by step 305 can be used so that the information packet can be forwarded from the victim server to the server (e.g., first server 130) indicated in the server connection information stored at the victim server (e.g., in its victim table).

Figure 4:
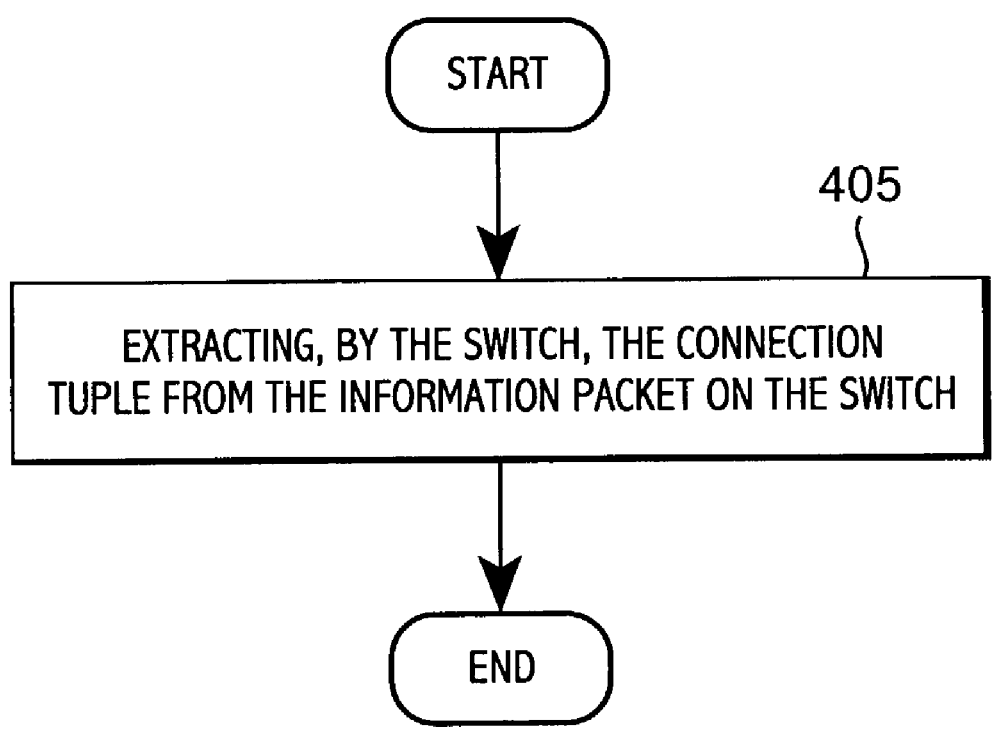
FIG. 4 is a flowchart illustrating steps for responding to the step of determining by reconstructing the connection information on the switch using connection information extracted from an information packet passing through the switch from at least one of plural servers in accordance with an exemplary embodiment of the present invention.

FIG. 4 illustrates an exemplary step of responding to the determination of an absence of connection information. In step 405, the switch extracts the entire connection tuple, including the source internet protocol (IP) address and destination IP address, from an information packet transmitted from the servers through the switch to reconstruct the switch connection information on the switch.

The steps of a computer program as illustrated in FIGS. 2-4 for reestablishing connection information in a computer network can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. As used herein, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A method for reestablishing connection information on a switch connected to plural servers in a computer network, comprising:
   identifying, at the switch, information to be transferred through the switch between a client and a first server;
   determining an absence of connection information on the switch used to transfer the information between the client and the first server through the switch;
   transferring the information to a victim server using a dispersal algorithm that is established at the switch through one of the plural servers, the victim server being one of the plural servers designated to handle the transfer upon determining an absence of connection information on the switch; and
   responding to the determining by reconstructing the connection information on the switch using connection information extracted from an information packet passing through the switch from at least one of the plural servers during a communication associated with the information.

2. The method of claim 1, wherein the information to be transferred through the switch is information included in the information packet from the at least one of the plural servers.

3. The method of claim 1, wherein the information to be transferred through the switch is information included in a first information packet transferred to the switch from the client, and the connection information is reconstructed on the switch using a second information packet sent by the at least one server to the switch in response to the first information packet.

4. The method of claim 1, comprising:
   determining a group membership of the computer network, wherein the group membership includes the plural servers that are active in the computer network.

5. The method of claim 4, wherein the group membership of the computer network is determined at predetermined time intervals.

6. The method of claim 4, comprising:
   allocating, by the plural servers, a computer network connection address space among the plural servers.

7. The method of claim 6, wherein the computer network connection address space is allocated among the plural servers based upon a connection load of each of the plural servers.

8. The method of claim 1, wherein at least one of the plural servers notifies the switch of the dispersal algorithm to be used by the switch for allocating computer network connection address space of the plural servers.

9. The method of claim 1, wherein the dispersal algorithm is a predetermined matching function which is known to the plural servers and which is stored at the switch.

10. The method of claim 9, comprising:
    storing the information in a computer memory of the victim server; and
    forwarding the information packet from the victim server to the at least one of the plural servers.

11. The method of claim 10, wherein the information packet is forwarded through the switch from the victim server to the at least one server, and wherein the information packet contains the address of the at least one server.

12. The method of claim 1, wherein the connection information is a connection tuple of the information packet.

13. The method of claim 12, wherein the responding comprises:
    extracting, by the switch, the connection tuple from the information packet on the switch.

14. A system for reestablishing connection information in a switch of a computer network, comprising:
   plural servers;
   a switch, connected to each of the plurality of servers, for identifying information transferred through the switch between a client and a first server, for determining an absence of connection information on the switch used to transfer the information from the client to the first server through the switch, and for responding to the determination of the absence of connection information by reconstructing the connection information on the switch using connection information extracted from an information packet passing through the switch from at least one of the plurality of servers during a communication associated with the information, wherein said switch is configured to transfer the information to a victim server using a dispersal algorithm that is established at the switch through one of the plurality of servers, the victim server being one of the plural servers designated to handle the transfer upon determining an absence of connection information on the switch.

15. The system of claim 14, wherein the information to be transferred through the switch is information included in the information packet from the at least one of the plural servers.

16. The system of claim 14, wherein the information to be transferred through the switch is information included in a first information packet transferred to the switch from the client, and the connection information is reconstructed on the switch using a second information packet sent by the at least one server to the switch in response to the first information packet.

17. The system of claim 14, wherein the switch and the plurality of servers determine a group membership of the computer network, and wherein the group membership includes the switch and the plurality of servers that are active in the computer network.

18. The system of claim 17, wherein the group membership of the computer network is determined at predetermined time intervals.

19. The system of claim 17, wherein the plurality of servers allocate a computer network connection address space among the plurality of servers.

20. The system of claim 14, wherein at least one of the plural servers notifies the switch of the dispersal algorithm to be used by the switch for allocating computer network connection address space of the plurality of servers.

21. The system of claim 14, wherein the dispersal algorithm is a predetermined matching function which is known to be plurality of servers and which is stored at the switch.

22. The system of claim 14, wherein the connection information is a connection tuple of the information packet.

23. A method for reestablishing connection information on a switch connected to plural servers in a computer network, comprising:
   identifying, at the switch, information to be transferred through the switch between a client and a first server;
   determining an absence of connection information on the switch used to transfer the information between the client and the first server through the switch; and
   responding to the determining by reconstructing the connection information on the switch using connection information extracted from an information packet passing through the switch from at least one of the plural servers during a communication associated with the information,
   wherein at least one of the plural servers notifies the switch of a dispersal algorithm to be used by the switch for allocating computer network connection address space of the plural servers and, upon determining an absence of connection information on the switch, the information is transferred to a victim server using the dispersal algorithm.

24. A system for reestablishing connection information in a switch of a computer network, comprising:
   plural servers;
   a switch, connected to each of the plurality of servers, for identifying information transferred through the switch between a client and a first server, for determining an absence of connection information on the switch used to transfer the information from the client to the first server through the switch, and for responding information from the client to the first server through the switch, and for responding to the determination of the absence of connection information by reconstructing the connection information on the switch using connection information extracted from an information packet passing through the switch from at least one of the plurality of servers during a communication associated with the information,
   wherein at least one of the plural servers notifies the switch of a dispersal algorithm to be used by the switch for allocating computer network connection address space of the plural servers and, upon determining an absence of connection information on the switch, the information is transferred to a victim server using the dispersal algorithm.

* * * * *

UNITED STATES PATENT AND TRADEMARK OFFICE
CERTIFICATE OF CORRECTION

| | | |
|---|---|---|
| PATENT NO. | : 7,363,347 B2 | Page 1 of 1 |
| APPLICATION NO. | : 10/289311 | |
| DATED | : April 22, 2008 | |
| INVENTOR(S) | : David Andrew Thomas | |

It is certified that error appears in the above-identified patent and that said Letters Patent is hereby corrected as shown below:

In column 14, lines 32-34, in Claim 24, after "responding" delete "information from the client to the first server through the switch, and for responding".

Signed and Sealed this

Twentieth Day of July, 2010

David J. Kappos
*Director of the United States Patent and Trademark Office*